Dec. 28, 1954  H. S. KELLY  2,698,057
DOWN-HOLE CASING SPRAY GUN
Filed Nov. 5, 1951
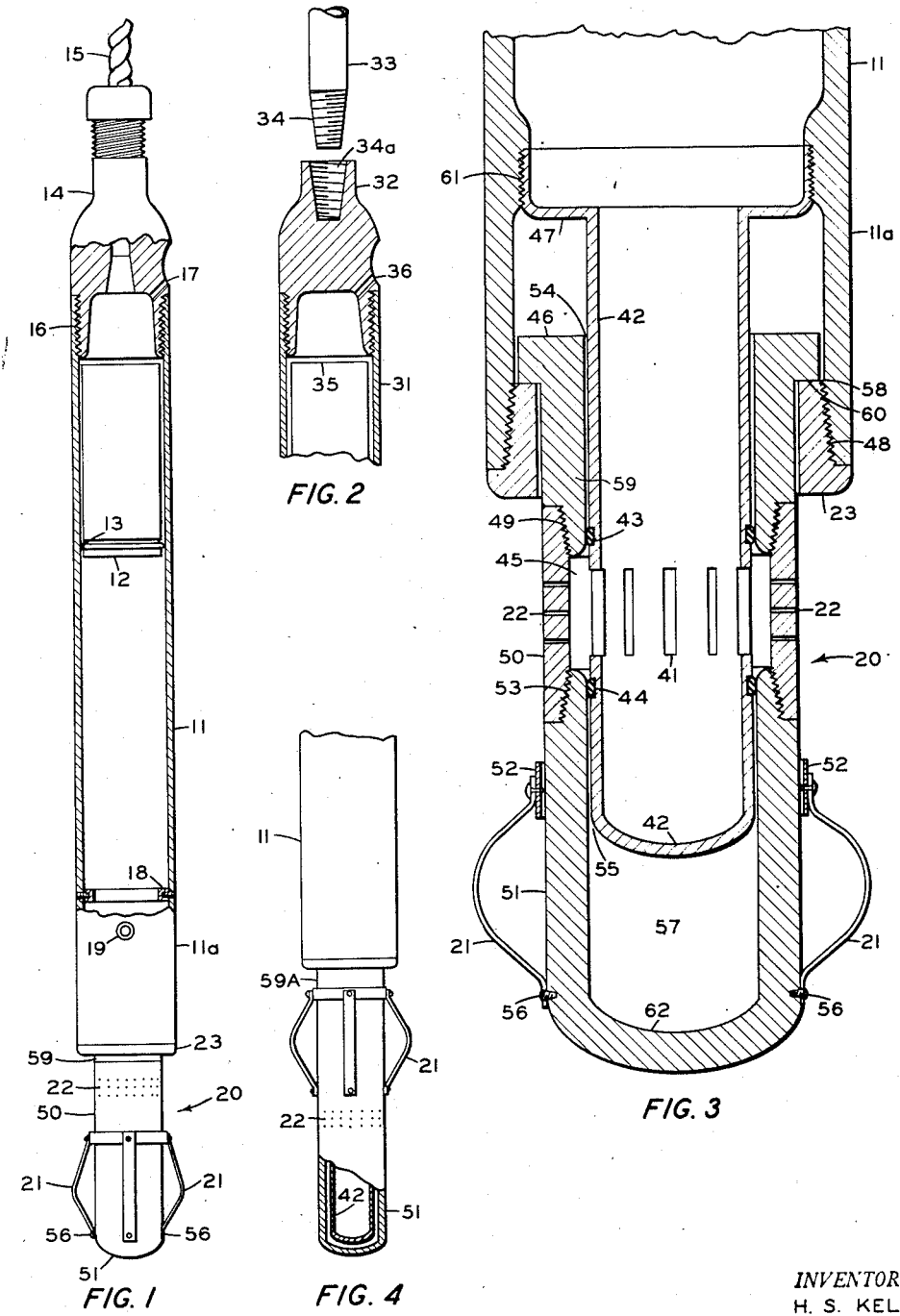
INVENTOR.
H. S. KELLY
BY
ATTORNEYS United States Patent Office 2,698,057
Patented Dec. 28, 1954

2,698,057

DOWN-HOLE CASING SPRAY GUN

Harold S. Kelly, Bartlesville, Okla., assignor to Phillips Petroleum Company, a corporation of Delaware Application November 5, 1951, Serial No. 254,960

6 Claims. (Cl. 166—165)

This invention relates to oil and gas well casing spray guns. In one aspect it relates to apparatus for spraying oil and gas well casings with a liquid.

Natural gas produced from the Wilcox Reservoir in the Oklahoma City Field normally contains a small amount of air as determined by the oxygen and nitrogen contents. In the production of natural gas from cased wells such an oxygen containing gas ordinarily rusts the inside of the well casing. In some cases this corrosion or rusting is sufficiently severe that well casings may fail. In fact some failures of casings under such conditions have occurred. When the rust or scale falls down to the bottom of the hole, it tends to plug off the producing formation.

I have devised a spray gun apparatus which is specifically adapted for use in spraying the inner walls of casing in gas wells in which the gas contains some free oxygen. The liquid used in spraying of gas or oil well casings may be crude oil, crude oil plus one or more additives or corrosion inhibitors or may be a gas-oil or other relatively viscous and adhering protective oil. The corrosion or formation of rust scale can be greatly retarded and the life of a casing materially extended by spray protecting the walls of the casing in a well producing free oxygen containing gas.

One object of my invention is to provide a device for applying a coating of liquid to the inner surface of a gas or oil well casing.

Another object of my invention is to provide a device for economically applying a protective coating to the inner wall of a gas or oil well casing.

Another object of my invention is to provide an apparatus which is simple to construct and inexpensive to operate for applying a protective coating to the inner wall of a gas or oil well casing.

Other objects and advantages of my invention will be realized upon reading the following description which taken with the attached drawing forms a part of this specification.

In the drawing Figure 1 is an elevational view, partly in section, of one embodiment of my invention. Figure 2 is an elevational view partly in section of a portion of another embodiment of my invention. Figure 3 is a sectional elevational view of a portion of the apparatus of Figure 1. Figure 4 is an elevational view of a portion of another embodiment of my invention, partly in section.

Referring to the drawing and specifically to Figure 1, element 11 is an elongated and cylindrical chamber or barrel for containing a charge of liquid to be sprayed upon the walls of casing. The upper end of this barrel is threaded at joint 16 to a tool head 14. This tool head 14 is a conventional rope socket which serves to connect cable 15 with barrel 11. The cable of course is for raising and lowering of the spray gun assembly in the well. Reference numeral 12 refers to a weighted plunger which is adapted for rising or falling in the barrel 11. A vent 17 is for outlet or inlet of air, gas or liquid into the barrel 11 above the plunger 12. In the lower portion of the barrel 11 is a ring 18 or shoulder intended to serve as a stop to the downward travel of the plunger 12. An inlet valve 19 is for the introduction of a liquid into the barrel against the weight of the plunger. An O-ring seal 13 is provided around the cylindrical wall of the plunger 12 to make the plunger fluid tight operatively with respect to the inner wall of the barrel 11. The lower portion of the apparatus of Figure 1 is identified by reference numeral 20 and is a slide valve mechanism. This slide mechanism is composed of a shouldered collar 59 below which is provided a spray nozzle ring 50. Below this spray nozzle ring is an elongated hollow plug 51. This plug 51 is provided with some winged guides 21 attached to the plug by screw fasteners 56. A bushing 23 is provided between the shouldered collar 59 and the lower section 11a of the barrel 11. The spray nozzle ring is provided with a plurality of spray nozzles 22.

In the embodiment illustrated in Figure 2 of the drawing a different connection is provided at the top of the apparatus for attaching the spray gun assembly to the lower end of a well tubing. Reference numeral 33 refers to a tubing section such as would be installed in an oil or gas well. The bottom end of a tubing is provided with threads 34 for meshing with threads 34a in a tool head 32. This tool head is provided with a vent 36 similar to the corresponding vent 17 in the cable tool head of Figure 1. This tubing tool head 32 is threaded to a barrel 31 similar to barrel 11 of Figure 1. Reference numeral 35 refers to a portion of a weighted plunger similar to plunger 12 of Figure 1.

The lower portion of the apparatus illustrated diagrammatically in Figure 1 is illustrated in detail in Figure 3. The upper portion of the figure is the lower portion of the barrel 11. A still lower portion of the wall of the barrel is a skirt like member 11a continuous with and extending on downward from the barrel 11. Some threads 61 are provided at the point of meeting of the barrel 11 and the skirt 11a. On the upper end of the enlarged upper section of the element 42 are some threads corresponding to said threads 61. This element 42 is actually a cylindrical element having its bottom end closed, some perforations or slots 41 as shown and its upper end flared and threaded to form the threaded joint 61 as illustrated.

A slide valve assembly 20 is composed of an elongated plug 51, a spray nozzle ring 50 threaded thereto at threads 53 and containing a shouldered collar 59 threaded at 49 to the top end of the spray nozzle ring 50. The upper end of the shouldered collar 59 is provided with a square shoulder providing an upper surface 46 for contacting the surface 47 at the upper flared end of the cylindrical element 42. This upper shoulder of element 59 also contains a lower surface 60 for contacting the upper surface 58 of the shouldered collar 59. In the operation of this device the surface 47 limits the upward movement of the valve assembly 20 while the surface 58 limits the lower movement thereof. The bushing 23 which provides this upper surface 58 is threaded to the lower end of the skirt 11a by threads 48. An O-ring 43 is provided as shown to form a seal between the outer wall of the cylinder 42 and the shouldered collar element 59 in its lowermost position. An O-ring 44 is provided just below the slots 41 for providing a seal between the outer surface of the cylinder 42 and the top portion of the elongated plug 51. The inner cylindrical surface of the spray nozzle ring 50 is some larger in diameter than is the diameter of the shouldered collar 59 and the elongated plug 51 in order to provide an annulus 45 of some appreciable cross sectional area. This annulus is intended to furnish space for liquid to flow from the slots 41 through all of the spray nozzles 22. The inner diameter of the shouldered collar 59 and the outer diameter of the cylinder 42 are made such as to form at least a small diameter annulus 54 to provide free movement of these surfaces with respect to each other. The inner diameter of the elongated plug 51 and the outer diameter of the cylinder 42 are also constructed that also at least a small diameter annulus 55 is provided therebetween for ease of relative movement. The elongated plug 51 is provided with sufficient length so that when this slide valve assembly 20 is at its uppermost position relative to the cylindrical element 42 some little space 57 is provided so that the lower end of the cylindrical element 42 and the upper surface 62 of the bottom of the plug will not touch each other. Some winged guides 21 are provided at the lower end of the slide valve assembly 20. These guides 21 are attached at one end by screw fasteners 56 to the elongated plug 51. The upper ends of these slides 52 are free to slide vertically as the guides 21 are pressed toward the surface of the elongated plug 51.

In the operation of the apparatus of my invention the apparatus is filled with, for example a crude or other oil to be used in a spraying operation while the apparatus is at the surface of the ground. The apparatus is filled with this oil by injecting same through the inlet valve 19 (Figure 1). This oil is injected under sufficient pressure to raise the weighted plunger 12 until the plunger reaches the top of the barrel 11. Any gas in the space above the top of the plunger is vented through the opening 17 during this filling operation. The valve 19 of course operates to prevent leakage of the oil from the apparatus. The spray valve assembly of my invention is in "closed" position at all times when the surface 46 of the shouldered collar 59 is in contact with the lower surface 47 of the flared end of the cylindrical member 42. In an actual filling operation this spray assembly will be suspended from the bottom end of a cable 15 or a tubing 33 at a well head in such a manner that the bottom end of the elongated plug 51 will be positioned upon the well platform. When the barrel 11 is filled with oil the apparatus may be inserted into the casing by lifting the assembly only several inches or at least sufficient to clear any obstruction between said point of raising and the open end of the casing. As the bottom end of the elongated plug 51 is guided into the top of the casing the winged guides 21 contact the casing and become compressed to such an extent as to exert some friction against the casing walls. The frictional resistance imparted by the winged guides 21 holds the slide valve assembly 20 in its closed position during all times that the spray assembly is traveling downward in the casing. Likewise these winged guides 21 hold the slide valve assembly in its closed position during all times that the spray gun assembly is held stationary in the well casing immediately following downward travel.

In order to open the slide valve assembly 20 to the flow of oil all that is necessary is to raise the apparatus up the casing a distance at least equal to the travel of the slide valve assembly 20, i. e., so that surfaces 58 and 60 touch each other. When these two annular surfaces are in mutual contact the slots 41 of the cylindrical member 42 and the spray nozzles 22 of the spray nozzle ring 50 are in their relative positions as shown in Figure 3. Liquid from within the barrel 11 then flows downward through the cylinder 42 through the slots 41 into the annular space 45 and thence in a radial and horizontal direction through the spray nozzles 22 to impinge against the wall of the casing. Upon opening the slide valve 20 in this manner and upon further hoisting of the entire assembly a vertical section of the well casing can be wetted with the liquid. Upon hoisting the spray assembly at a rapid rate an extensive vertical length of the casing can be wetted by one filling of the spray assembly.

At any time it is desired to close the spray valve assembly, all that is necessary is to stop the upward movement of the spray assembly and to permit a short downward movement sufficient to raise relatively the annular surface 46 on the top of the shouldered collar 59 to contact the annular surface 47 on the top end of the cylinder 42 by the frictional drag imparted by the winged guides 21 on the walls of the casing.

The embodiment illustrated in Figure 2 of the drawing wherein the spray assembly is used on the bottom end of a tubing 33 has special utility wherein the spray assembly may be charged with a wetting oil and lowered into the well as a tubing string is run. In this case the spray assembly with its charge of oil rests on the bottom of the hole until such time as it is desired to pull the tubing. The tubing may then be pulled and the well casing sprayed in one operation. This operation will then be carried out by pulling the tubing spray assembly upward a distance of one or more lengths of tubing, then lowering the tubing a few inches to close the valve assembly 20. When the valve assembly 20 is closed then one or more tubing sections above the surface of the ground may be disconnected. The tubing assembly is then pulled upward several additional lengths of tubing and again lowered several inches to close the slide valve 20. The several additional tubing lengths then are removed from the string. Upon repeating this pulling and valve shutting operation a sufficient number of times the entire string of tubing 33 is removed and the spray assembly may be disconnected therefrom or the last and final length of tubing may not be disconnected from the spray assembly. When the spray assembly is setting on the production platform or the slide valve assembly 20 may be allowed to remain in the casing head while the remainder of the spray assembly, that is the barrel 11 and skirt 11a may be lowered a few inches to close the valve 20 and the barrel 11 refilled with spray liquid through the valve 19. Upon the refilling of the apparatus with spray liquid the assembly is again ready for lowering into the well. For this lowering operation all that is necessary is to lower the spray assembly one or more lengths of tubing until the threads of the top tubing joint are so situated that an additional length of tubing can be screwed into the upper threaded end of the length of tubing at the well head.

However while the embodiment of my invention as regards use of my spray apparatus on the bottom end of tubing may be employed to advantage under certain conditions I prefer to use my apparatus on the end of a cable, such as cable 15 of Figure 1. In this manner when a spraying operation is begun the spray assembly may be raised in a casing at any desired rate of speed and the time required to spray a casing wall is naturally less than that required when the spray gun assembly is mounted on the end of a tubing string. Likewise considerable less time is required to pull the spray gun and recharge same with the new charge of spray oil.

Materials of construction for use in building my spray gun assembly may in general be selected from those commercially available. When the assembly is used on the end of a cable there is substantially no corrosive effect since the spray assembly will be in use in a well for only a relatively short period of time. However when the assembly is used on the end of a tubing string and the assembly may be positioned in a well casing for considerable lengths of time, for example a number of months, it may be preferable under some conditions to construct the apparatus of corrosion resistant materials. However in case there is some oil in the bottom of the well and this spray assembly will be fully immersed in the oil, then the materials of construction need not necessarily be selected to be resistant from corrosion since they will not normally be exposed to corrosive conditions. If some water is present in the bottom of the well it may be advisable to select materials of construction taking into consideration possible corrosion from this source.

The O-rings 13, 43 and 44 should of course be constructed of such resilient material as will not be affected by the solvent action of oil. For example these rings may be constructed of synthetic or rubber-like synthetic materials which are in general relatively resistant to the solvent action of oil.

The ring 18 of Figure 1 can in some cases be omitted if the valve 19 is placed below shoulder 18A of Figure 3 since the function of ring 18 is to protect valve 19 from contact with the plunger 12.

In a preferred embodiment as represented in Figure 4, the winged guides are placed above the spray nozzles 22, which positioning makes for a mechanically superior apparatus. Apparatus part 59A of Figure 4 corresponds to member 59 of Figure 3, but the member 59A is sufficiently longer, axially, than member 59 to provide sufficient space for installation of the guides 21 when the spray nozzles 22 of the slide valve mechanism 20 are in a closed position as indicated in Figure 4 with the lower end of element 51 being adjacent the lower end of element 42.

While certain embodiments of the invention have been described for illustrative purposes, the invention obviously is not limited thereto.

I claim:

1. A down-hole casing spray gun comprising, in combination, an elongated barrel adapted to hold a charge of spray liquid, a vent in and a tool head attached to the top end of said barrel, a weighted plunger in the barrel, a spray liquid inlet valve in said barrel and near its bottom for charging the barrel with spray liquid, a discharge opening in said barrel, a liquid spray flow control slide valve surrounding the lower end of the barrel and closed at its lower end, a plurality of spray nozzles in said slide valve communicable with said discharge opening to direct the flow of spray liquid radially therefrom, a sealing means intermediate said slide valve and said lower end of said barrel to eliminate leakage of spray liquid when the flow control valve is closed, and a pair of winged guide members disposed on the outer surface of and near the bottom end of said slide valve for centering the spray gun in the hole and for moving the slide valve with respect to said barrel upon raising and lowering said barrel in a well casing to open and to close said valve, respectively.

2. A down-hole casing spray gun comprising, in combination, an elongated barrel adapted to hold a charge of spray liquid, a vent in and a tool head attached to the top end of said barrel, a weighted plunger in said barrel, an inlet valve in said barrel, said inlet valve being near the bottom of said barrel and below the plunger for charging the barrel with spray liquid, and a spray liquid control valve assembly comprising, in combination, an elongated cylindrical chamber the top end of which is operatively attached to said barrel near its bottom end, an opening in the cylindrical sidewall of said chamber, a cylindrical vertically movable slide valve surrounding said cylindrical chamber, a spray nozzle in the sidewall of said slide valve, the inner diameter of the slide valve sidewall being greater at the level of said spray nozzle than at levels above and below said spray nozzle thereby providing an annular space intermediate said opening in said chamber and said spray nozzle, said opening in said chamber and said spray nozzle being at the same level and in communication when said slide valve is at the lower limit of its extent of movement, a first O-ring seal in the outer wall of said chamber at a level just above said opening in said chamber, a second O-ring seal in the outer wall of said chamber at a level just below said opening in said chamber, a first shoulder facing downward on said barrel near its bottom end, a second shoulder facing upward below said first shoulder on said barrel, a flange on the upper end of said slide valve intermediate said shoulders, and said shoulders limiting the extent of movement of said slide valve, and a pair of winged guides disposed on the outer surface of said slide valve at a point near its bottom.

3. A down-hole casing spray gun comprising, in combination, an elongated barrel adapted to hold a charge of a spray liquid, a vent in and a tool head attached to the top end of said barrel, a weighted plunger in said barrel, an inlet valve in said barrel, said inlet valve being near the bottom of said barrel and below the plunger for charging the barrel with spray liquid, and a liquid spray control valve assembly comprising, in combination, an elongated cylindrical chamber the top end of which is operatively attached to said barrel near its bottom end, a plurality of openings disposed circumferentially around the cylindrical wall of said chamber, a cylindrical vertical movable slide valve surrounding said cylindrical chamber, a plurality of spray nozzles disposed circumferentially around the sidewall of said slide valve, the inner diameter of the slide valve sidewall being greater at the level of said plurality of spray nozzles than at levels above and below said plurality of spray nozzles thereby providing an annular space intermediate said opening in said chamber and said spray nozzles, said openings in said chamber and said spray nozzles being at the same level and in communication when said slide valve is at the lower limit of its extent of movement, a first O-ring seal in the outer wall of said chamber and intermediate said chamber and said slide valve at a level just above said openings in said chamber, a second O-ring seal in the outer wall of said chamber and intermediate said chamber and said slide valve at a level just below said openings in said chamber, a first shoulder facing downward on said barrel near its bottom end, a second shoulder facing upward below said first shoulder on said barrel, a flange on the upper end of said slide valve intermediate said shoulders, and said shoulders limiting the extent of movement of said slide valve, and a pair of winged guides disposed on the outer surface of said slide valve at a point near its bottom.

4. The spray gun of claim 3 wherein the extent of movement of said slide valve is such that at its lower end of movement the openings in the chamber and the spray nozzles communicate with each other so that fluid from within said chamber is sprayed from said spray nozzles, and at its upper end of movement the upper O-ring seal and the slide valve operate to close off the flow of spray liquid.

5. A down-hole casing spray gun comprising, in combination, an elongated reservoir, a tool head attached to the top end of said reservoir, a weighted plunger in said reservoir, a liquid flow control valve assembly attached to the bottom end of said reservoir, said control valve assembly comprising, in combination, a chamber attached to the lower end of said reservoir, a slidable sleeve surrounding said chamber and closed at its lower end, a pair of winged guides disposed on the outer surface of said sleeve for centering the spray gun within a casing, an opening in said chamber, a spray nozzle in said sleeve, said winged guides being adapted to tend to resist vertical movement of said sleeve within said casing thereby opening and closing the liquid flow control valve upon raising the elongated reservoir and attached chamber and lowering the elongated reservoir and attached chamber, respectively, in said casing, said spray nozzle in said sleeve being in communication with said opening in said chamber when said chamber is raised with respect to said sleeve and said spray nozzle in said sleeve being out of communication with said opening in said chamber when said chamber is lowered with respect to said sleeve.

6. A down-hole casing spray gun comprising, in combination, an elongated barrel adapted to hold a charge of spray liquid, a vent in and a tool head attached to the top end of said barrel, a weighted plunger in the barrel, a spray liquid inlet valve in said barrel and near its bottom for charging the barrel with spray liquid, a discharge opening in said barrel, a liquid spray flow control slide valve surrounding the lower end of the barrel and closed at its lower end, a plurality of spray nozzles in said slide valve communicable with said discharge opening to direct the flow of spray liquid radially therefrom, a sealing means intermediate said slide valve and said lower end of said barrel to eliminate leakage of spray liquid when the flow control valve is closed, and a pair of winged guide members disposed on the outer surface of said slide valve and above said spray nozzles for centering the spray gun in the hole and for opening said flow control valve upon lowering the slide valve with respect to said barrel and for closing the flow control valve upon raising the slide valve with respect to said barrel in a well casing.

References Cited in the file of this patent

UNITED STATES PATENTS

| Number | Name | Date |
| --- | --- | --- |
| 1,449,672 | Hallvarson | Mar. 27, 1923 |
| 1,959,660 | Edgecomb | May 22, 1934 |
| 2,170,355 | Stephens | Aug. 22, 1939 |
| 2,207,478 | Cameron | July 9, 1940 |
| 2,235,318 | Halliburton | Mar. 18, 1941 |
| 2,387,002 | Bannister | Oct. 16, 1945 |
| 2,526,021 | Fultz | Oct. 17, 1950 |